(12) United States Patent
Hori

(10) Patent No.: US 9,780,382 B2
(45) Date of Patent: Oct. 3, 2017

(54) FUEL CELL, FUEL CELL STACK, AND FUEL CELL APPARATUS

(75) Inventor: Yuuichi Hori, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 2039 days.

(21) Appl. No.: 12/438,511

(22) PCT Filed: Aug. 24, 2007

(86) PCT No.: PCT/JP2007/066491
§ 371 (c)(1),
(2), (4) Date: Jun. 24, 2010

(87) PCT Pub. No.: WO2008/023805
PCT Pub. Date: Feb. 28, 2008

(65) Prior Publication Data
US 2010/0266925 A1    Oct. 21, 2010

(30) Foreign Application Priority Data

Aug. 24, 2006 (JP) .................................. 2006-227905
Mar. 13, 2007 (JP) .................................. 2007-063430
Mar. 13, 2007 (JP) .................................. 2007-063431

(51) Int. Cl.
*H01M 4/86* (2006.01)
*H01M 8/1213* (2016.01)
(Continued)

(52) U.S. Cl.
CPC ....... *H01M 4/8657* (2013.01); *H01M 8/1213* (2013.01); *H01M 8/1253* (2013.01);
(Continued)

(58) Field of Classification Search
CPC .................................................. H01M 4/8657
(Continued)

(56) References Cited

U.S. PATENT DOCUMENTS 5,114,803 A    5/1992 Ishihara et al. .................. 429/30
5,753,385 A    5/1998 Jankowski et al.
(Continued)

FOREIGN PATENT DOCUMENTS

EP    1284519 A2    2/2003
JP    04-067564    3/1992
(Continued)

OTHER PUBLICATIONS

Supplemental European search report dated Jul. 3, 2012 issued in corresponding European application 07806077.9.
(Continued)

*Primary Examiner* — Scott J Chmielecki
(74) *Attorney, Agent, or Firm* — Volpe and Koenig, P.C.

(57) ABSTRACT

The invention relates to a fuel cell having superior durability by suppressing a reaction between a component contained in a solid electrolyte and an oxygen-side electrode during a long-period operation, a fuel cell stack and a fuel cell apparatus using thereof. A fuel cell (10) includes a solid electrolyte (9) containing Zr, an intermediate layer (4) and an oxygen-side electrode (1) that are disposed in this order on one surface of the solid electrolyte (9), and a fuel-side electrode (7) disposed on another surface opposed to the oxygen-side electrode (1) of the solid electrolyte (9). The intermediate layer (4) includes a surface layer region (4a) that contains Zr and is on a side of the solid electrolyte (9), and another region (4b) except the surface layer region (4a) that does not contain Zr. Accordingly, it is possible to suppress a reaction between Zr and the oxygen-side electrode (1) and suppress power generation performance degradation of the fuel cell (10).

11 Claims, 2 Drawing Sheets

(51) Int. Cl.
*H01M 8/1253* (2016.01)
*H01M 8/124* (2016.01)

(52) U.S. Cl.
CPC ............... *H01M 2008/1293* (2013.01); *H01M 2300/0077* (2013.01); *Y02E 60/521* (2013.01); *Y02E 60/525* (2013.01); *Y02P 70/56* (2015.11)

(58) Field of Classification Search
USPC ........................................................ 429/479
See application file for complete search history.

(56) References Cited

U.S. PATENT DOCUMENTS

| | | | |
|---|---|---|---|
| 6,007,683 A | | 12/1999 | Jankowski et al. |
| 6,228,521 B1* | | 5/2001 | Kim .................... H01M 4/8657 429/496 |
| 2003/0012996 A1* | | 1/2003 | Bitterlich et al. .............. 429/33 |
| 2003/0044667 A1 | | 3/2003 | Hara et al. |
| 2004/0142229 A1* | | 7/2004 | Herman .............. H01M 4/8621 429/425 |
| 2005/0095496 A1* | | 5/2005 | Hori .................... H01M 4/8657 429/467 |
| 2005/0181253 A1* | | 8/2005 | Finnerty et al. ................ 429/30 |
| 2006/0099473 A1 | | 5/2006 | Hart et al. |
| 2006/0113034 A1* | | 6/2006 | Seabaugh ........... H01M 8/1246 156/308.2 |
| 2006/0199057 A1* | | 9/2006 | Hiwatashi ........... H01M 8/1253 429/489 |
| 2007/0117006 A1* | | 5/2007 | Zhan ........................ B22F 3/11 429/486 |

FOREIGN PATENT DOCUMENTS

| | | |
|---|---|---|
| JP | 04-355059 | 12/1992 |
| JP | 04355059 A | 12/1992 |
| JP | 09-266000 | 10/1997 |
| JP | 2003-288914 | 10/2003 |
| JP | 2004-063226 | 2/2004 |
| JP | 2005-327507 | 11/2005 |
| JP | 2005-327637 | 11/2005 |
| WO | 2005015675 A2 | 2/2005 |

OTHER PUBLICATIONS

European office action dated Jul. 16, 2012 issued in corresponding European application 07806077.9.
Chinese language office action dated Sep. 1, 2010 and its English language translation for corresponding Chinese application 200780031538.7.
Tsoga et al., "Gadolinia-Doped Ceria and Yttria Stabilized Zirconia Interfaces: Regarding Their Application for SOFC Technology" Acta Materialia, vol. 48, pp. 4709-4714, 2000.

* cited by examiner

FUEL CELL, FUEL CELL STACK, AND FUEL CELL APPARATUS

CROSS-REFERENCE TO THE RELATED APPLICATIONS

This application is a national stage of international application No. PCT/JP2007/066491 filed Aug. 24, 2007, which is also claims the benefit of priority under 35 U.S.C. 119 to Japanese Patent Application No. 2006-227905 filed Aug. 24, 2006, Japanese Patent Application No. 2007-063430 filed Mach 13, 2007 and Japanese Patent Application No. 2007-063431 filed Mar. 13, 2007, the entire contents of which are incorporated herein by reference.

TECHNICAL FIELD

The present invention relates to a fuel cell which has a solid electrolyte, an oxygen-side electrode disposed on one surface of the solid electrolyte, a fuel-side electrode disposed on the other surface of the solid electrolyte, and an intermediate layer interposed between the solid electrolyte and the oxygen-side electrode; a fuel cell stack; and a fuel cell apparatus.

BACKGROUND ART

In recent years, various types of fuel cell apparatuses, in which a fuel cell stack including a plurality of fuel cells that are electrically connected in series is housed in a container, are being proposed as a next-generation energy.

FIG. 3 shows a conventional solid electrolyte fuel cell stack, which fuel cell stack has a configuration in which a plurality of fuel cells 21 (21a, 21b) are aligned and assembled, and a current collector member 25 made of a metal felt is interposed between a fuel cell 21a and another fuel cell 21b so that a fuel-side electrode 27 of the fuel cell 21a and an oxygen-side electrode 23 of the other fuel cell 21b are electrically connected.

Further, the fuel cell 21 (21a, 21b) has a configuration in which a solid electrolyte 29 and an oxygen-side electrode 23 made of conductive ceramics are disposed sequentially on the outer periphery of a cylindrical fuel-side electrode 27 made of a metal. An interconnector 22 is disposed on the fuel-side electrode 27 that is exposed through the solid electrolyte 29 and the oxygen-side electrode 23 so as to prevent a connection with the oxygen-side electrode 23. The interconnector 22 is electrically connected to the fuel-side electrode 27.

This interconnector 22 is formed of conductive ceramics that is dense and is difficult to transform by a fuel gas and an oxygen-containing gas, in order to reliably insulate the fuel gas that flows through the fuel-side electrode 27 and the oxygen-containing gas that flows outside the oxygen-side electrode 23 from each other.

The electrical connection between the fuel cell 21a and the other fuel cell 21b is established by connecting the fuel-side electrode 27 of the fuel cell 21a to the oxygen-side electrode 23 of the other fuel cell 21b via the interconnector 22 disposed on the fuel-side electrode 27, and the current collector member 25.

Furthermore, a fuel cell apparatus is configured by housing the above-described fuel cell stack into a container, and generates power at about 1000° C. by feeding fuel (hydrogen) into the fuel-side electrode 27 and air (oxygen) into the oxygen-side electrode 23.

In such a fuel cell 21, generally, the fuel-side electrode 27 is made of $ZrO_2$ (YSZ) that contains $N_1$ and $Y_2O_3$, the solid electrolyte 29 is made of $ZrO_2$ (YSZ) that contains $Y_2O_3$, and the oxygen-side electrode 23 is formed of a $LaMnO_3$-based composite oxide in which Sr (strontium) coexists.

Also, a production method has been proposed recently in which a solid electrolyte and an oxygen-side electrode are co-sintered (co-fired). However, the co-sintering of a solid electrolyte and an oxygen-side electrode is problematic in that a component (e.g., Sr, or the like) contained in the oxygen-side electrode diffuses into the solid electrolyte, forming a reaction layer having a high electrical resistance on the interface between the solid electrolyte and the oxygen-side electrode, and as a result, causing performance degradation of the fuel cell.

In view of this, for the purpose of preventing performance degradation of fuel cells caused by co-sintering of the solid electrolyte and the oxygen-side electrode, a fuel cell in which an intermediate layer is formed between the solid electrolyte and the oxygen-side electrode, and a method for producing such a fuel cell have been proposed (see, for example, Japanese Unexamined Patent Publications JP-A 2003-288914 and JP-A 2004-63226).

Also, in order to provide a solid electrolyte fuel cell apparatus that has superior durability against heat cycles and provides sufficient power generation performance, a solid electrolyte fuel cell apparatus has been proposed in which a solid electrolyte layer, an reaction-preventing layer, a mixing layer, and an air electrode layer are laminated sequentially on a surface of a fuel electrode substrate, and the mixing layer contains the materials of the reaction-preventing layer and the air electrode layer (see, for example, Japanese Unexamined Patent Publication JP-A 2005-327637).

Furthermore, in order to provide a fuel cell apparatus that has superior durability and power generation performance, a solid electrolyte fuel cell apparatus has been proposed in which a solid electrolyte, an reaction-preventing layer, and an air electrode layer are laminated sequentially on the upper surface of a fuel electrode substrate, the reaction-preventing layer includes a first reaction-preventing layer and a second reaction-preventing layer having pores, and the solid electrolyte layer, the first reaction-preventing layer and the second reaction-preventing layer are co-sintered (see, for example, Japanese Unexamined Patent Publication JP-A 2005-327507).

However, even when an intermediate layer made of a single layer is formed between the solid electrolyte and the oxygen-side electrode, it is still problematic in that a situation can occur in which a component (Zr, zirconium) contained in the solid electrolyte diffuses into the intermediate layer and a component (Sr) contained in the oxygen-side electrode diffuses into the solid electrolyte, and when power generation is continued for a long period of time, the diffused solid electrolyte component reacts with the component that has diffused from the oxygen-side electrode, forming a reaction layer having a high electrical resistance, which causes power generation performance degradation of the fuel cell apparatus. In addition, there is another problem in that the component contained in the oxygen-side electrode diffuses into the solid electrolyte, and the oxygen-side electrode component that has been thus contained into the solid electrolyte reacts with the solid electrolyte component, forming a reaction layer having a high electrical resistance, and as a result, causing power generation performance degradation of the fuel cell apparatus.

Furthermore, in the case of a fuel cell in which the solid electrolyte is fired first, and after that, the intermediate layer is fired, there is a problem in that sufficient fixation between the solid electrolyte and the intermediate layer is not obtained, and when the fuel cell apparatus is operated for a long period of time for power generation, a separation occurs between the solid electrolyte and the intermediate layer, and as a result, causing power generation performance degradation of the fuel cell apparatus.

Furthermore, even when an reaction-preventing layer is disposed on the surface of the solid electrolyte layer and a mixing layer containing an oxygen-side electrode component is disposed on the surface of the reaction-preventing layer in order to prevent the separation between the solid electrolyte layer and the oxygen-side electrode as disclosed in JP-A 2005-327637, when the fuel cell apparatus is operated for a long period of time for power generation, a problem arises in that an oxygen-side electrode component or oxygen-side electrode component contained in the mixing layer reacts with a solid electrolyte component that has diffused into the reaction layer, or the oxygen-side electrode component diffuses into the solid electrolyte and reacts with the solid electrolyte component, forming a reaction layer having a high electrical resistance, and as a result, causing power generation performance degradation of the fuel cell apparatus.

Also, even when two reaction-preventing layers are formed as disclosed in JP-A 2005-327507, a solid electrolyte component (Zr) can diffuse into the reaction-preventing layer (second reaction-preventing layer) during the process of co-sintering a solid electrolyte, a first reaction-preventing layer and a second reaction-preventing layer, and when power generation is continued for a long period of time, the solid electrolyte component (Zr) that has diffused into the reaction-preventing layer (the second reaction-preventing layer) reacts with the oxygen-side electrode component (Sr), forming a reaction layer having a high electrical resistance, and as a result, causing power generation performance degradation of the fuel cell apparatus.

DISCLOSURE OF INVENTION

It is an object of the invention to provide a fuel cell that suppresses diffusion of Zr contained in a solid electrolyte into an oxygen-side electrode to suppress formation of a reaction layer having high electrical resistance, and also suppresses power generation performance degradation; and a fuel cell stack and a fuel cell apparatus that use such a fuel cell.

Further, it is another object of the invention to provide a fuel cell that suppresses diffusion of Sr contained in the oxygen-side electrode into the solid electrolyte to suppress formation of a reaction product having a high resistance in the solid electrolyte, and also suppresses power generation performance degradation; and a fuel cell stack and a fuel cell apparatus that use such a fuel cell.

Yet further, it is another object of the invention to provide a fuel cell that suppresses diffusion of Zr contained in the solid electrolyte into the oxygen-side electrode, and also suppresses diffusion of Sr contained in the oxygen-side electrode into the solid electrolyte, and the resulting incorporation of Sr into the solid electrolyte, thereby suppressing reaction between Zr contained in the solid electrolyte and Sr contained in the oxygen-side electrode during long-term operation and suppressing power generation performance degradation; and a fuel cell stack and a fuel cell apparatus that use such a fuel cell.

The invention provides a fuel cell comprising a solid electrolyte containing Zr; an intermediate layer and an oxygen-side electrode that are disposed in this order on one surface of the solid electrolyte; and a fuel-side electrode disposed on another surface opposed to the one surface of the solid electrolyte, the intermediate layer including a surface layer region that contains Zr and is on the side of the solid electrolyte, and another region except the surface layer region that does not contain Zr.

In such a fuel cell, because the intermediate layer is disposed between the solid electrolyte containing Zr and the oxygen-side electrode, and the intermediate layer includes a surface layer region that contains Zr and is on the side of the solid electrolyte and the other region that does not contain Zr, the solid electrolyte and the intermediate layer (the surface layer region) can be tightly bonded. Consequently, it is possible to effectively suppress the solid electrolyte and the intermediate layer (the surface layer region) from separating from each other.

Also, because the other region of the intermediate layer does not contain Zr, a reaction layer having a high electrical resistance resulting from a reaction between Zr and the oxygen-side electrode can be suppressed from being formed in the intermediate layer (the other region) and the oxygen-side electrode.

Accordingly, it is possible to tightly bond the solid electrolyte and the intermediate layer (the surface layer region), as well as to suppress formation of a reaction layer having a high electrical resistance resulting from a reaction between Zr and the oxygen-side electrode. As a result, power generation performance degradation can be suppressed from being caused in the fuel cell, and the power generation performance degradation of the fuel cell during long-time power generation can be suppressed.

The invention provides a fuel cell comprising a solid electrolyte; an intermediate layer and an oxygen-side electrode containing Sr that are disposed in this order on one surface of the solid electrolyte; and a fuel-side electrode disposed on another surface opposed to the one surface of the solid electrolyte, the intermediate layer including a surface layer region on a side of the solid electrolyte that is formed to be denser than another region of the intermediate layer.

In such a fuel cell, because the intermediate layer is disposed between the solid electrolyte and the oxygen-side electrode, Sr contained in the oxygen-side electrode can be prevented from diffusing into the solid electrolyte. Consequently, it is possible to prevent a solid electrolyte component and Sr from forming a reaction product having a high electrical resistance in the solid electrolyte, and the power generation performance degradation of the fuel cell during long-time power generation can be prevented.

Here, in the configuration, because the surface layer region of the intermediate layer that is on the side of the solid electrolyte is formed to be denser than the other region, even in the event that Sr contained in the oxygen-side electrode permeates through the other region of the intermediate layer and diffuses into the surface layer region, Sr can be prevented from diffusing into the solid electrolyte. Although causes are not clearly known, presumably, it is largely because grain boundary diffusion of Sr occurs. Consequently, it is possible to prevent Sr and the solid electrolyte from forming a reaction product in the solid electrolyte, so that power generation performance degradation can be suppressed from being caused in the fuel cell, and the power generation performance degradation of the fuel cell during long-time power generation can be suppressed.

The invention provides a fuel cell comprising a solid electrolyte containing Zr; an intermediate layer and an oxygen-side electrode containing Sr that are disposed in this order on one surface of the solid electrolyte; and a fuel-side electrode disposed on another surface opposed to the one surface of the solid electrolyte, the intermediate layer including a surface layer region that contains Zr and is on a side of the solid electrolyte and another region that does not contain Zr, the surface layer region being denser than the other region.

In such a fuel cell, because the intermediate layer is disposed between the solid electrolyte containing Zr and the oxygen-side electrode containing Sr, and the intermediate layer includes a surface layer region that contains Zr and is on the side of the solid electrolyte and the other region that does not contain Zr, it is possible to suppress formation of a reaction layer having a high electrical resistance in the oxygen-side electrode and the intermediate layer (the other region) resulting from a reaction between Zr and Sr.

Furthermore, the intermediate layer is disposed between the solid electrolyte and the oxygen-side electrode, and thereby Sr contained in the oxygen-side electrode can be prevented from diffusing into the solid electrolyte. In this configuration, because the surface layer region of the intermediate layer that is on the side of the solid electrolyte is formed to be denser than the other region, even in the event that Sr contained in the oxygen-side electrode permeates through the other region of the intermediate layer and diffuses into the surface layer region, it is possible to prevent Sr from diffusing into the solid electrolyte.

This can also suppress Zr contained in the solid electrolyte from diffusing into the oxygen-side electrode, as well as suppress Sr contained in the oxygen-side electrode from diffusing into the solid electrolyte. Furthermore, it is also possible to suppress Sr contained in the oxygen-side electrode from being contained (diffusing) into the solid electrolyte.

Accordingly, formation of a reaction layer having a high electrical resistance resulting from a reaction between Zr and Sr can be suppressed (prevented), and at the same time, the solid electrolyte and the intermediate layer (the surface layer region) can be bonded tightly, and as a result, power generation performance degradation can be suppressed from being caused in the fuel cell, and the power generation performance degradation of the fuel cell during long-time power generation can be suppressed.

Also, in the fuel cell of the invention, it is preferable that the intermediate layer includes a first layer that forms the surface layer region and a second layer that forms the other region, and the first layer and the solid electrolyte are co-sintered.

In such a fuel cell, by co-sintering (co-firing) the solid electrolyte and the first layer that forms the surface layer region of the intermediate layer, Zr contained in the solid electrolyte diffuses into the first layer, and thereby the solid electrolyte and the first layer are bonded tightly, and as a result, a separation between the solid electrolyte and the first layer can be suppressed. Consequently, the power generation performance degradation of the fuel cell during long-time power generation can be suppressed.

Further, in the fuel cell of the invention, it is preferable that the second layer is sintered at a temperature lower than a temperature at which the solid electrolyte and the first layer are co-sintered.

In such a fuel cell, after the solid electrolyte and the first layer have been co-sintered, the second layer is formed on the surface of the first layer by being sintered at a temperature lower than the temperature at which the solid electrolyte and the first layer were co-sintered, and therefore Zr contained in the solid electrolyte does not diffuse into the second layer, which means that the second layer will not contain Zr.

Consequently, because the second layer that is bonded to the oxygen-side electrode does not contain Zr, it is possible to suppress a reaction between Zr and a component (e.g., Sr) contained in the oxygen-side electrode from occurring in the second layer, and power generation performance degradation during long-time power generation can be suppressed, and thus a fuel cell with superior long-term reliability can be provided.

Also, in the fuel cell of the invention, it is preferable that the first layer and the second layer contain a same rare earth element, which is not an element contained in the oxygen-side electrode.

In such a fuel cell, with the first layer and the second layer of the intermediate layer that contain the same rare earth element (except for the elements contained in the oxygen-side electrode, for example, Sr), it is possible to bring a coefficient of thermal expansion of the first layer and that of the second layer closer to each other, and the bonding strength between the first layer and the second layer can be improved. Accordingly, the separation between the first layer and the second layer can be suppressed, and therefore power generation performance degradation of the fuel cell during long-time power generation can be suppressed, and a fuel cell with superior long-term reliability can be obtained.

Further, in the fuel cell of the invention, it is preferable that the first layer has a thickness of 1 to 10 μm, and the second layer has a thickness of 5 to 20 μm.

In such a fuel cell, by forming the first layer to have a thickness of 1 to 10 μm, Zr contained in the solid electrolyte can be sufficiently diffused into the first layer, the solid electrolyte and the first layer can be bonded tightly, and Sr contained in the oxygen-side electrode can be prevented from diffusing into the solid electrolyte.

On the other hand, by forming the second layer of the intermediate layer to have a thickness of 5 to 20 μm, it is possible to suppress the second layer from separating from the first layer. Also, it is possible to reduce the amount of Sr that is contained in the oxygen-side electrode and permeates through the second layer due to long-term continuous operation. Consequently, Sr contained in the oxygen-side electrode can be prevented from diffusing into the solid electrolyte, power generation performance degradation of the fuel cell during long-time power generation can be suppressed, and a fuel cell with a long-term reliability can be obtained.

The invention provides a fuel cell stack comprising a plurality of fuel cells which are any of the fuel cells mentioned above and are electrically connected in series.

Because such a fuel cell stack is configured by electrically connecting a plurality of fuel cell that suppress power generation performance degradation during long-time power generation and that have superior long-term reliability, the fuel cell stack can supply sufficient power for the required load and have superior long-term reliability.

The invention provides a fuel cell apparatus comprising a container and the above-described fuel cell stack housed in the container.

Because such a fuel cell apparatus is produced by housing the fuel cell stack that has superior long-term reliability in a container, the fuel cell apparatus can have superior long-term reliability.

The fuel cell of the invention includes a solid electrolyte containing Zr; an intermediate layer and an oxygen-side electrode that are disposed in this order on one surface of the solid electrolyte, the intermediate layer including a surface layer region that contains Zr and is on the side of the solid electrolyte, and another region that does not contain Zr. Thus, a fuel cell with superior long-term reliability in which power generation performance degradation during long-time power generation is suppressed can be obtained. Furthermore, with the fuel cell of the invention, it is possible to provide a fuel cell stack with long-term reliability and a fuel cell apparatus with superior long-term reliability.

The fuel cell of the invention includes a solid electrolyte; and an intermediate layer and an oxygen-side electrode layer containing Sr that are disposed in this order on one surface of the solid electrolyte, the intermediate layer including a surface layer region on the side of the solid electrolyte that is formed to be denser than another region of the intermediate layer. Thus, a fuel cell with superior long-term reliability in which power generation performance degradation during long-time power generation is suppressed can be obtained. Furthermore, with the fuel cell of the invention, it is possible to provide a fuel cell stack with long-term reliability and a fuel cell apparatus with superior long-term reliability.

The fuel cell of the invention includes a solid electrolyte containing Zr; and an intermediate layer and an oxygen-side electrode containing Sr that are disposed in this order on one surface of the solid electrolyte, the intermediate layer including a surface layer region that contains Zr and is on the side of the solid electrolyte and another region that does not contain Zr, the surface layer region being denser than the other region. Thus, a fuel cell with superior long-term reliability in which power generation performance degradation during long-time power generation is suppressed can be obtained. Furthermore, with the fuel cell of the invention, it is possible to provide a fuel cell stack with long-term reliability and a fuel cell apparatus with superior long-term reliability.

BRIEF DESCRIPTION OF DRAWINGS

Other and further objects, features, and advantages of the invention will be more explicit from the following detailed description taken with reference to the drawings wherein:

FIG. 1A being a transverse cross sectional view and FIG. 1B being a perspective view of FIG. 1A;

BEST MODE FOR CARRYING OUT THE INVENTION

Figure 1A:
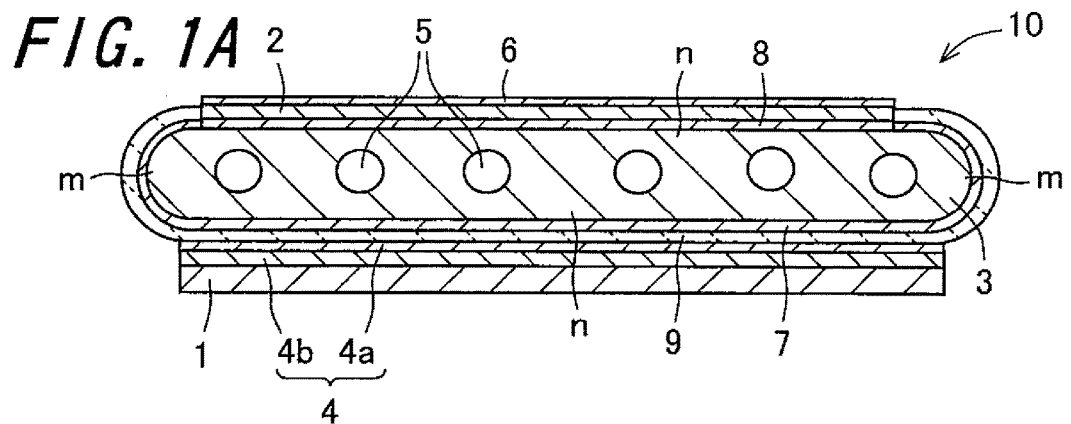
FIGS. 1A and 1B show examples of a fuel cell, according to the invention.

Now referring to the drawings, preferred embodiments of the invention are described below.

Figure 1B:
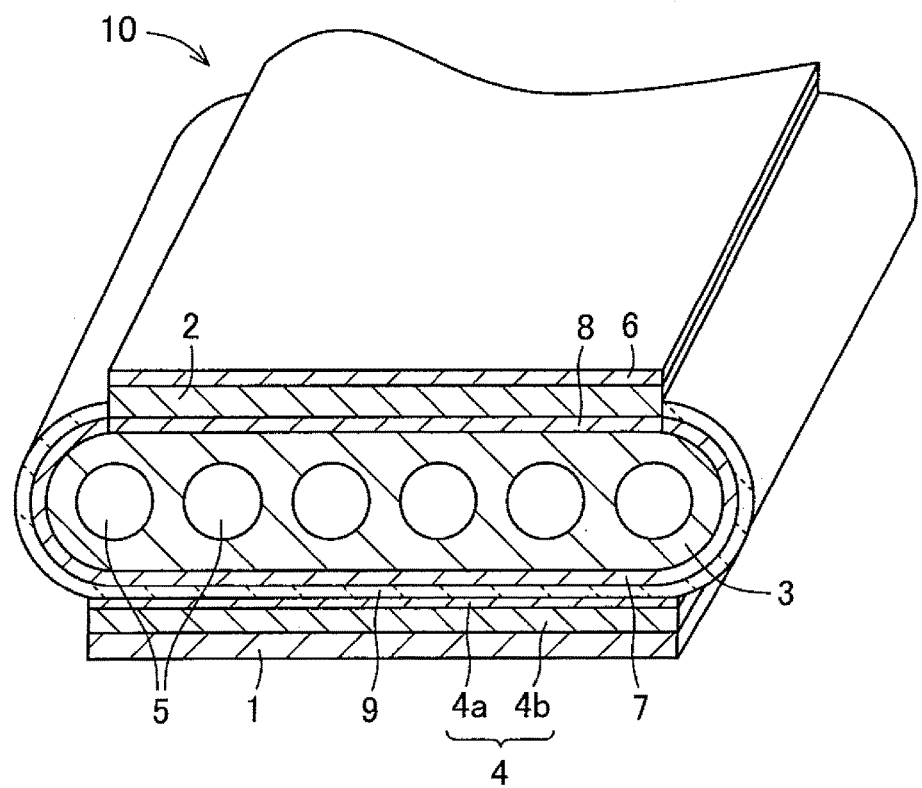
Figure 2:
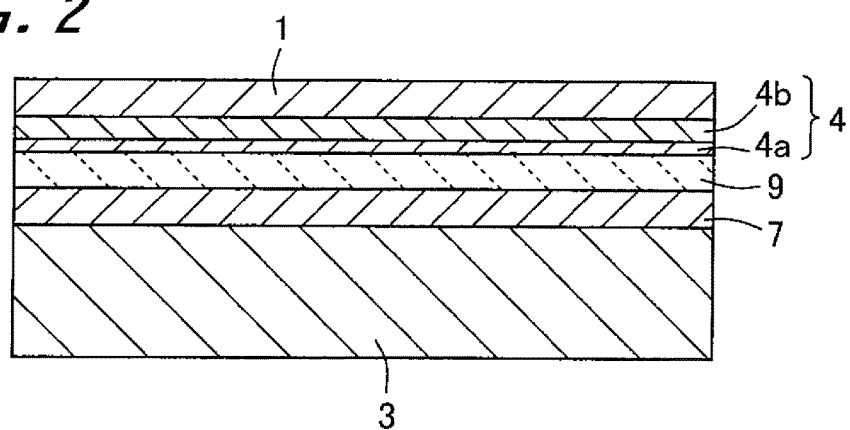
FIG. 2 is an enlarged transverse cross sectional view of the parts of example of the fuel cell according to the invention that are involved in power generation.
Figure 3:
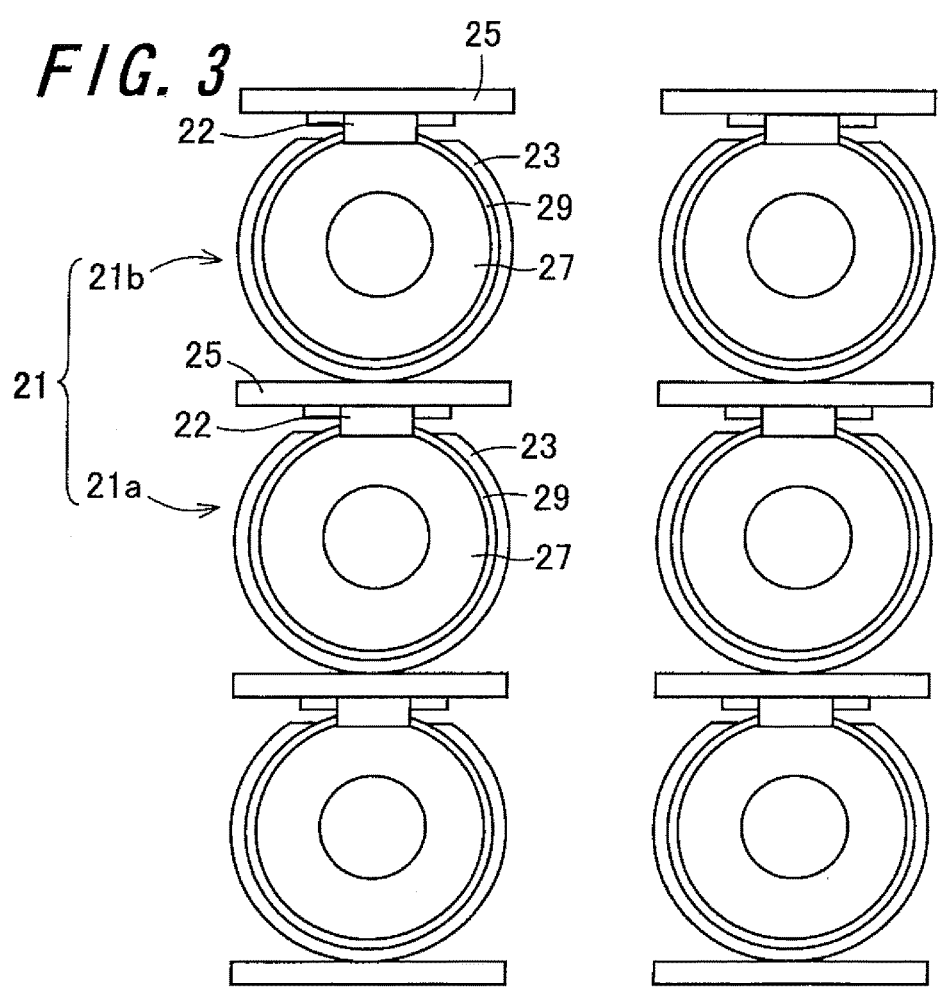
FIG. 3 is a transverse cross sectional view of a cell stack made of conventional fuel cells.

FIG. 1A shows a transverse cross section of a hollow flat fuel cell 10, and FIG. 1B is a perspective view of the fuel cell 10, in both of which, the configuration of the fuel cell 10 is partially enlarged. Also, FIG. 2 is an enlarged cross sectional view of the parts of the fuel cell 10 according to the invention that are involved in power generation.

The fuel cell 10 includes a conductive support substrate 3 having a flat cross section and an elliptical cylindrical shape as a whole. Inside the conductive support substrate 3, a plurality of fuel gas flow channels 5 are formed with an appropriate spacing therebetween in the longitudinal direction. The fuel cell 10 has a structure in which various members are disposed on this conductive support substrate 3.

As can be understood from the shape shown in FIG. 1A, the conductive support substrate 3 is configured with flat portions n and arc portions m that are located on both ends of the flat portions n. The two surfaces constituting the flat portions n are formed to be nearly parallel to each other, and a fuel-side electrode 7 is disposed such that it covers one flat portion n (lower surface) and the arc portions m on both sides. Furthermore, a dense solid electrolyte 9 is laminated such that it covers the fuel-side electrode 7. Furthermore, an oxygen-side electrode 1 that contains Sr is laminated on the solid electrolyte 9 with an intermediate layer 4 interposed therebetween such that the oxygen-side electrode 1 faces the fuel-side electrode 7. An interconnector 2 is formed on the surface constituting the other flat portion n where the fuel-side electrode 7 and the solid electrolyte 9 are not laminated. As can be seen from FIGS. 1A and 1B, the fuel-side electrode 7 and the solid electrolyte 9 are configured to extend to both sides of the interconnector 2 via the arc portions m on both ends such that the surface of the conductive support substrate 3 is not exposed to the outside.

In the fuel cell 10, the portion of the fuel-side electrode 7 that faces (is opposed to) the oxygen-side electrode 1 functions as a fuel-side electrode. That is, the fuel cell 10 generates power by feeding an oxygen-containing gas such as air to the outside of the oxygen-side electrode 1 and a fuel gas (hydrogen gas) to the gas channels 5 formed in the conductive support substrate 3, and heating to a predetermined operation temperature. The current generated through such power generation is collected via the interconnector 2 attached to the conductive support substrate 3.

In the invention, it is preferable that the solid electrolyte 9 disposed on the outer surface of the conductive support substrate 3 is formed of dense ceramics made of partially stabilized or stabilized $ZrO_2$ that contains 3 to 15 mol % of a rare earth element such as Y (yttrium), Sc (scandium) or Yb (ytterbium). The rare earth element is preferably Y because it is inexpensive. Furthermore, from the viewpoint of preventing gas permeation, it is desirable that the solid electrolyte 9 is dense with a relative density (in accordance with Archimedean method) of 93% or more, even more desirably 95% or more, and the solid electrolyte 9 preferably has a thickness of 5 to 50 μm.

And, in the invention, an intermediate layer 4 is disposed on the surface of the solid electrolyte 9. Here, the intermediate layer 4 includes a surface layer region (indicated by 4a in the drawings) that contains Zr and is on a side of the solid electrolyte 9 and another region (indicated by 4b in the drawings) that does not contain Zr. The surface layer region 4a is formed to be denser than the other region 4b.

Thus, the solid electrolyte 9 and the intermediate layer 4 (the surface layer region 4a) can be bonded tightly to each other, the intermediate layer 4 (the surface layer region 4a) can be suppressed from separating from the solid electrolyte 9, and power generation performance degradation of the fuel cell 10 during long-term power generation operation can be suppressed.

In addition, because the other region 4b does not contain Zr, it is possible to suppress formation of a reaction layer having a high electrical resistance in the oxygen-side electrode 1 and the intermediate layer (the other region 4b) resulting from a reaction between Zr and a component (Sr) contained in the oxygen-side electrode 1.

Furthermore, because the intermediate layer 4 is disposed between the solid electrolyte 9 and the oxygen-side electrode 1, even in the event that Sr contained in the oxygen-side electrode 1 diffuses toward the side of the solid electrolyte 9, the intermediate layer 4 can prevent Sr from diffusing into the solid electrolyte 9. Also, in the intermediate layer 4, because the surface layer region 4a on the side of the solid electrolyte 9 is formed to be denser than the other region 4b, even in the event that Sr contained in the oxygen-side electrode 1 permeates through the other region 4b, the dense surface layer region 4a can prevent the diffusion of Sr, that is, prevent Sr from diffusing into the solid electrolyte 9. It is thereby possible to prevent formation of a reaction layer having a high electrical resistance in the solid electrolyte 9 resulting from a reaction between Zr in the solid electrolyte 9 and Sr contained in the oxygen-side electrode 1.

Accordingly, the reaction between Zr and Sr in the other region 4b of the intermediate layer 4 and in the oxygen-side electrode 1 can be suppressed (diffusion of Zr contained in the solid electrolyte 9 into the oxygen-side electrode 1 can be suppressed) and the reaction between Zr and Sr in the solid electrolyte 9 can be prevented (diffusion of Sr contained in the oxygen-side electrode 1 into the solid electrolyte 9 can be prevented). In addition, because the solid electrolyte 9 and the intermediate layer 4 (the surface layer region 4a) are tightly connected, power generation performance degradation can be suppressed from being caused in the fuel cell 10, and the power generation performance degradation of the fuel cell 10 during long-time power generation can be suppressed.

It is sufficient that the intermediate layer 4 (the surface layer region 4a) contains Zr in the produced fuel cell 10 of the invention, and thus the raw material of the surface layer region 4a does not necessarily contain Zr. Accordingly, Zr may be contained in the surface layer region 4a as a result of, for example, diffusion of Zr contained in the solid electrolyte 9 into the surface layer region 4a when producing the fuel cell 10.

Here, the surface layer region 4a of the intermediate layer 4 and the other region 4b of the intermediate layer 4 described above can be formed as a first layer 4a and a second layer 4b, respectively. In this case, it is sufficient that the second layer 4b has a density lower than that of the first layer 4a, and the second layer 4b may be formed of a plurality of layers. For this reason, it is possible to employ, for example, a configuration in which the second layer 4b is formed of two layers to form the intermediate layer 4 as a whole having three layers. It is also possible to form more layers.

And, in the case where the intermediate layer 4 is formed of a first layer 4a and a second layer 4b, it is preferable that the first layer 4a and the second layer 4b are formed to include, for example, the same rare earth element (except for the elements contained in the oxygen-side electrode 1, for example, Sr). Consequently, a coefficient of thermal expansion of the first layer 4a and that of the second layer 4b can be brought closer to each other, and as a result, the bonding strength between the first layer 4a and the second layer 4b can be improved. Here, the elements contained in the oxygen-side electrode 1, for example, Sr are excluded. Here, the reason for this is to effectively suppress the reaction between Zr contained in the intermediate layer 4 and a component (Sr) of the oxygen-side electrode 1 during long-term power generation, and the resulting formation of a reaction layer having a high electrical resistance:

The same rare earth element can be, for example, Ce (cerium), and in particular, the raw material powder used for producing the first layer 4a and the second layer 4b preferably has a composition represented by, for example, the following formula:

$$(CeO_2)_{1-x}(REO_{1.5})_x, \quad (1):$$

where RE represents at least one of Sm, Y, Yb and Gd, and x is a number that satisfies $0 < x \le 0.3$. Examples of rare earth elements RE except for Ce include Sm (samarium), Y, Yb and Gd (gadolinium), and these rare earth elements can be selected as appropriate.

Thus, when the first layer 4a and the second layer 4b are formed using a raw material powder that contains at least one rare earth element as the same rare earth element, the thermal expansion coefficients of the first layer 4a and the second layer 4b can be small. Consequently, the coefficient of thermal expansion of the intermediate layer 4 can be brought closer to the coefficient of thermal expansion of the solid electrolyte 9 containing Zr, and thus the occurrence of cracking or separation caused by the difference between the thermal expansion coefficients can be suppressed. It is also possible to produce the first layer 4a and the second layer 4b with the same composition.

Furthermore, it is preferable that the first layer 4a and the second layer 4b are made of, for example, $CeO_2$ solid solution containing Sm or Gd, and the raw material powders preferably have compositions represented by the following formulas:

$$(CeO_2)_{1-x}(SmO_{1.5})_x \text{ and} \quad (2):$$

$$(CeO_2)_{1-x}(GdO_{1.5})_x, \quad (3):$$

where x is a number that satisfies $0 < x \le 0.3$. From the viewpoint of reducing electrical resistance, it is preferable to use $CeO_2$ solid solution containing 10 to 20 mol % of $SmO_{1.5}$ or $GdO_{1.5}$. In order to increase the effect of suppressing diffusion of Zr contained in the solid electrolyte 9 and the effect of suppressing formation of reaction product of the component of the solid electrolyte 9 and Sr, the raw material powders may contain an oxide of other rare earth elements (e.g., $Y_2O_3$, $Yb_2O_3$, or the like).

And, by forming the intermediate layer 4 including a first layer 4a that contains Zr and a second layer 4b that does not contain Zr and is formed on the surface of the first layer 4a between the solid electrolyte 9 and the oxygen-side electrode 1, the separation of the intermediate layer 4 from the solid electrolyte 9 can be prevented, and the reaction between a component (Zr) contained in the intermediate layer 4 and a component (Sr) contained in the oxygen-side electrode 1 can be suppressed effectively, and as a result, it is possible to provide a fuel cell with superior long-term reliability in which power generation degradation during long-time power generation is suppressed.

Also, because the first layer 4a and the second layer 4b contain the same rare earth element, (Ce, or the like), the bonding strength between the first layer 4a and the second layer 4b can be improved.

And, by forming the intermediate layer 4 (the first layer 4a and the second layer 4b) and the oxygen-side electrode 1 in this order on one surface of the solid electrolyte 9, incorporation (diffusion) of Sr contained in the oxygen-side electrode 1 into the solid electrolyte 9 can be prevented, power generation performance degradation can be suppressed from being caused in the fuel cell 10, and the power generation performance degradation of the fuel cell 10 during long-time power generation can be suppressed. As used herein, no incorporation of Sr into the solid electrolyte 9 refers to a case in which the presence of Sr is not confirmed in the solid electrolyte 9 by, for example, EPMA (X-ray microanalyzer) area analysis, and also encompasses a case in which the presence of Sr is not confirmed by other methods. Also, the same applies to the presence or absence of Zr in the first layer 4a and the second layer 4b.

Here, it is preferable that the solid electrolyte 9 and the first layer 4a are formed by co-sintering (co-firing), and the second layer 4b and the oxygen-side electrode 1 are formed in this order on the first layer 4a. That is, it is preferable that the solid electrolyte 9 and the first layer 4a is co-sintered and then the second layer 4b is formed in a separate step.

According to such a production method, which will be described later, the solid electrolyte 9 and the first layer 4a are co-sintered at a high temperature, and thus Zr contained in the solid electrolyte 9 diffuses into the first layer 4a, causing the solid electrolyte 9 and the first layer 4a to be bonded tightly to each other, and making the first layer 4a dense.

Also, the second layer 4b is formed on the surface of the first layer 4a through sintering in a step that is different from the co-sintering step, and thereby the second layer 4b can be formed to have a low density. For this reason, for example, in a case of forming the second layer 4b and then forming the oxygen-side electrode 1, the bonding strength between the second layer 4b and the oxygen-side electrode 1 can be improved by the anchor effect. Consequently, the separation of the oxygen-side electrode 1 from the second layer 4b can be suppressed, and power generation performance degradation of the fuel cell 10 during long-time power generation can be suppressed.

Here, it is sufficient that the second layer 4b has a density lower than that of the first layer 4a, but no limitation is intended to be imposed on forming of the second layer 4b to be denser in order to prevent Sr, which is a component of the oxygen-side electrode 1, from being contained into the solid electrolyte 9 (to suppress diffusion of Sr). It is, however, preferable to form the second layer 4b by making appropriate adjustment such that the second layer 4b and the oxygen-side electrode 1 can be tightly bonded to each other by the anchor effect.

Here, in the case where the second layer 4b is formed of a plurality of layers, it is preferable that the layer bonded to the oxygen-side electrode 1 is bonded by the anchor effect. Therefore, the second layer 4b can be formed by making appropriate adjustment, including, for example, forming layers that constitute the second layer 4b sequentially and then forming the layer bonded to the oxygen-side electrode 1 separately.

Incidentally, the presence or absence of Zr in the intermediate layer 4 refers to whether or not the presence of Zr is confirmed in the intermediate layer 4 by, for example, EPMA (X-ray microanalyzer) area analysis, and it is also possible to determine the presence or absence of Zr in the intermediate layer 4 by other methods.

And, by making the second layer 4b dense, diffusion of Sr contained in the oxygen-side electrode 1 into the solid electrolyte 9 can be further prevented (suppressed). The second layer 4b can be made dense by changing the temperature and time at which the second layer 4b is heat-treated as appropriate according to the particle size of the raw material of the second layer 4b.

Because it is preferable that the second layer 4b has a density lower than that of the first layer 4a, it is preferable to sinter the second layer 4b at, for example, a temperature lower than the temperature at which the first layer 4a and the solid electrolyte 9 are co-sintered.

By co-sintering the solid electrolyte 9 and the first layer 4a and then sintering the second layer 4b on the surface of the first layer 4a at a temperature lower than the temperature used in the co-sintering, diffusion of Zr contained in the solid electrolyte 9 into the second layer 4b can be suppressed. Consequently, the second layer 4b will not contain Zr, and it is thus possible to suppress formation of a reaction layer having a high electrical resistance in the oxygen-side electrode 1 that is formed on the second layer 4b.

Furthermore, by sintering the second layer 4b at a temperature lower than the temperature at which the solid electrolyte 9 and the first layer 4a are co-sintered, the density of the second layer 4b can be made low. Consequently, the second layer 4b and the oxygen-side electrode 1 can be bonded tightly by the anchor effect.

When the second layer 4b is sintered at a temperature lower than the temperature at which the solid electrolyte 9 and the first layer 4a are co-sintered, specifically, it is preferable to sinter the second layer 4b, for example, at a temperature 200° C. or more lower than the temperature used in the co-sintering. As a specific example of the temperature, for example, it is preferable to sinter the second layer 4b at 1100 to 1300° C.

Also, in the fuel cell of the invention, it is preferable that the first layer 4a has a thickness of 1 to 10 μm and the second layer 4b has a thickness of 5 to 20 μm.

By forming the first layer 4a to have a thickness of 1 to 10 μm, Zr contained in the solid electrolyte 9 can be diffused sufficiently into the first layer 4a, the solid electrolyte 9 and the first layer 4a can be bonded tightly, and the first layer 4a can be suppressed from separating from the solid electrolyte 9. Furthermore, diffusion of Sr contained in the oxygen-side electrode 1 into the solid electrolyte 9 can be prevented effectively.

Also, by forming the second layer 4b to have a thickness of 5 to 20 μm, with respect to Sr contained in the oxygen-side electrode 1, the amount of Sr that permeates through the second layer 4b during long-term continuous operation can be reduced. Consequently, diffusion of Sr contained in the oxygen-side electrode 1 into the solid electrolyte 9 can be prevented, power generation performance degradation of the fuel cell 10 during long-time power generation can be suppressed, and a fuel cell 10 with superior long-term reliability can be obtained.

Furthermore, by forming the second layer 4b to have a thickness of 5 to 20 μm, the bonding strength between the first layer 4a and the second layer 4b can be improved, and the separation of the second layer 4b from the first layer 4a can be suppressed. Note that care needs to be taken when the second layer 4b is formed to have a thickness of 20 μm or more, because the separation of the second layer 4b from the first layer 4a can occur due to the difference in coefficient of thermal expansion between the second layer 4b and the first layer 4a.

Further, in the invention, it is preferable that the oxygen-side electrode 1 is formed of conductive ceramics made of so-called $ABO_3$ perovskite-type oxide. The perovskite-type oxide is preferably at least one of transition metal perovskite-type oxides, particularly, a $LaMnO_3$-based oxide, a $LaFeO_3$-based oxide, and a $LaCoO_3$-based oxide in which Sr and La (lanthanum) coexist in the A site. Particularly, it is preferable to use $LaCoO_3$-based oxide because it exhibits high electrical conductivity at the operation temperature ranging from about 600 to 1000° C. In the perovskite-type oxide, Fe (iron) or Mn (manganese) may exist together with Co in the B site.

Furthermore, it is necessary that the oxygen-side electrode 1 has gas permeability, and thus, the conductive ceramics (perovskite-type oxide) that forms the oxygen-side electrode 1 has an open porosity of 20% or more, and particularly, an open porosity within a range from 30 to 50% is preferred. Further, the thickness of the oxygen-side electrode 1 is preferably 30 to 100 μm from the viewpoint of current collectivity.

Hereinafter, other members that constitute the fuel cell 10 of the invention will be described.

The conductive support substrate 3 is required to have gas permeability to allow fuel gas to permeate therethrough to the fuel-side electrode 7 and to have electrical conductivity to collect current via the interconnector 2. Accordingly, it is preferable that the conductive support substrate 3 is made of, for example, an iron group metal component and a specific rare earth oxide.

Examples of the iron group metal component include a simple substance of iron group metal, an iron group metal oxide, an alloy of iron group metals, and an alloy oxide. More specifically, examples of the iron group metal include Fe, Ni (nickel) and Co. In the invention, although any of the above can be used, it is preferable that Ni and/or NiO are contained as the iron group component because Ni and NiO are inexpensive and stable in fuel gas.

Further, the specific rare earth oxide is used to bring the coefficient of thermal expansion of the conductive support substrate 3 closer to that of the solid electrolyte 9, and a rare earth oxide containing at least one selected from the group consisting of Y, Lu (lutetium), Yb, Tm (thulium), Er (erbium), Ho (holmium), Dy (dysprosium), Gd, Sm, and Pr (praseodymium) is used in combination with the above-described iron group component. Specific examples of such rare earth oxide include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. Particularly, $Y_2O_3$ and $Yb_2O_3$ are preferred because these substances hardly form a solid solution or react with iron group metal oxides, have a coefficient of thermal expansion nearly equal to that of the solid electrolyte 9, and are inexpensive.

Furthermore, in the invention, it is preferable that the iron group metal component and the rare earth oxide component exist at a volume ratio of 35:65 to 65:35 in order to maintain good conductivity of the conductive support substrate 3 and bring the coefficient of thermal expansion closer to that of the solid electrolyte 9. The conductive support substrate 3 may contain other metal components and oxide components as long as the required characteristics are not impaired.

Also, because it is necessary that the conductive support substrate 3 ordinarily has fuel gas permeability, the conductive support substrate 3 has an open porosity of 30% or more, and particularly, an open porosity within a range from 35 to 50% is preferred. It is also preferable that the conductivity of the conductive support substrate 3 is 300 S/cm or more, and particularly, a conductivity of 440 S/cm or more is preferred.

The length of the flat portion n of the conductive support substrate 3 (the length in the width direction of the conductive support substrate 3) is ordinarily, 15 to 35 mm, and the length of the arc portion m (arc length) is 2 to 8 mm. The thickness of the conductive support substrate 3 (the thickness between the two surfaces constituting the flat portions n) is preferably 1.5 to 5 mm.

In the invention, the fuel-side electrode 7 serves to cause an electrode reaction, and is preferably formed of known conductive porous ceramics. For example, fuel-side electrode 7 is formed of $ZrO_2$ solid solution containing a rare earth element or $CeO_2$ solid solution containing a rare earth element, and Ni and/or NiO.

In the fuel-side electrode 7, the content of the $ZrO_2$ solid solution containing a rare earth element or the content of the $CeO_2$ solid solution containing a rare earth element is preferably within a range from 35 to 65 vol %, and the content of Ni or NiO is preferably 65 to 35 vol %. Furthermore, the open porosity of the fuel-side electrode 7 is 15% or more, and particularly, an open porosity within a range from 20 to 40% is preferred. The fuel-side electrode 7 preferably has a thickness of 1 to 30 μm. When the thickness of the fuel-side electrode 7 is too small, for example, the performance may be reduced. Conversely, when the thickness is too large, a separation or the like resulting from the difference in coefficient of thermal expansion between the solid electrolyte 9 and the fuel-side electrode 7 may occur.

Further, in the example shown in FIGS. 1A and 1B, the fuel-side electrode 7 extends to both sides of the interconnector 2, but it is sufficient that the fuel-side electrode 7 is formed in the position in which it faces the oxygen-side electrode 1, and for this reason, the fuel-side electrode 7 may be formed, for example, only on the flat portion n on which the oxygen-side electrode 1 is disposed. Also, the interconnector 2 can be disposed directly on the flat portion n of the conductive support substrate 3 on which the solid electrolyte 9 is not disposed. In this case, a potential drop between the interconnector 2 and the conductive support substrate 3 can be suppressed.

Furthermore, a layer 8 having a composition similar to that of the fuel-side electrode 7 may be formed between the interconnector 2 and the conductive support substrate 3 in order to reduce the difference in coefficient of thermal expansion between the interconnector 2 and the conductive support substrate 3. FIGS. 1A and 1B show a state in which the layer 8 having a composition similar to that of the fuel-side electrode 7 is formed between the interconnector 2 and the conductive support substrate 3.

Also, the interconnector 2, which is disposed on the conductive support substrate 3 with the layer 8 having a composition similar to that of the fuel-side electrode 7 interposed therebetween in the position that is opposed to the oxygen-side electrode 1, is preferably formed of conductive ceramics, and it needs to have reduction resistance and oxidation resistance because it contacts a fuel gas (hydrogen gas) and an oxygen-containing gas. For this reason, as the conductive ceramics having reduction resistance and oxidation resistance, a lanthanum chromite-based perovskite-type oxide ($LaCrO_3$-based oxide) is usually used. In order to prevent leakage of the fuel gas that passes through the inside of the conductive support substrate 3 and the oxygen-containing gas that passes through the outside of the conductive support substrate 3, the conductive ceramics needs to be dense, and has a relative density of, for example, 93% or more, and particularly, a relative density of 95% or more is preferred.

Further, the interconnector 2 preferably has a thickness of 10 to 200 μm in terms of gas leakage prevention and electrical resistance. When the thickness is smaller than this range, gas leakage is likely to occur. Conversely, when the thickness is larger than this range, the electrical resistance increases, and the current collecting function may be reduced due to a potential drop.

Also, it is preferable to provide a P-type semiconductor layer 6 on the outer surface (upper surface) of the interconnector 2. By connecting a current collector member to the interconnector 2 via the P-type semiconductor layer 6, the contact between the current collector member and the P-type semiconductor layer 6 can be made into an ohmic contact, which reduces the potential drop, and effectively avoids the degradation of the current collecting performance.

An example of such a P-type semiconductor layer 6 can be a layer made of a transition metal perovskite-type oxide. Specifically, it is possible to use P-type semiconductor ceramics having an electron conductivity larger than that of $LaCrO_3$-based oxide constituting the interconnector 2, and for example, P-type semiconductor ceramics made of at least one of a $LaMnO_3$-based oxide, a $LaFeO_3$-based oxide, a $LaCoO_3$-based oxide and the like, in which Mn, Fe, Co or the like exists in the B site. Generally, such a P-type semiconductor layer 6 preferably has a thickness within a range from 30 to 100 μm.

A method for producing the above-described fuel cell 10 of the invention will now be described. The following description illustrates an example in which the second layer 4b is formed as a single layer.

First, a mixture is prepared by mixing an iron group metal, such as Ni, or an oxide powder thereof with a powder of a rare earth oxide such as $Y_2O_3$, an organic binder, and a solvent. This mixture is extruded to produce a compact for conductive support substrate 3, and the compact is dried. As the compact for conductive support substrate 3, a calcined compact obtained by calcining the compact for conductive support substrate 3 at 900 to 1000° C. for 2 to 6 hours may be used.

Next, raw materials of NiO and $ZrO_2$ (YSZ) solid solution containing $Y_2O_3$ are weighed and mixed in accordance with, for example, a predetermined formulation composition. After that, the resulting powder mixture is mixed with an organic binder and a solvent to prepare a fuel-side electrode 7 slurry.

Furthermore, toluene, a binder, a commercially available dispersant, and the like are added to the powder of $ZrO_2$ solid solution containing a rare earth element to prepare a slurry. The slurry is formed into a sheet shape having a thickness of 7 to 75 μm by means of a doctor blade or the like to produce a compact for solid electrolyte 9. A slurry for fuel-side electrode 7 is applied onto the obtained sheet-shaped compact for solid electrolyte 9 to form a compact for fuel-side electrode 7. The surface of the compact for solid electrolyte 9 that is on a side of the compact for fuel-side electrode 7 is laminated onto the compact for conductive support substrate 3. Here, it is also possible to apply the slurry for fuel-side electrode 7 onto a predetermined position of the compact for conductive support substrate 3, dry it, and laminate the compact for solid electrolyte 9, on which the slurry for fuel-side electrode 7 is applied, onto the compact for conductive support substrate 3.

Subsequently, for example, powder of $CeO_2$ solid solution containing $SmO_{1.5}$ is subjected to a heat treatment at 800 to 900° C. for 2 to 6 hours, and then to wet pulverization to adjust the aggregation number to 5 to 35 so as to prepare a raw material powder for compact for intermediate layer 4. It is desirable that the wet pulverization is performed with a ball mill for 10 to 20 hours using a solvent. The same applies to the case of forming the intermediate layer 4 using powder of $CeO_2$ solid solution containing $GdO_{1.5}$.

In the invention, toluene as a solvent is added to the raw material powder for compact for intermediate layer 4 having an adjusted aggregation number to produce a slurry for intermediate layer 4. This slurry is applied onto the compact for solid electrolyte 9 to form a coating film for first layer 4a, and thus a compact for first layer 4a is produced. It is also possible to produce a sheet-shaped compact for first layer 4a and laminate the sheet-shaped compact for first layer 4a onto the compact for solid electrolyte 9.

Subsequently, a slurry is prepared by mixing a material for interconnector 2 (e.g., $LaCrO_3$-based oxide powder), an organic binder and a solvent. A sheet for interconnector 2 is produced, and the produced sheet is laminated onto the exposed surface of the compact for conductive support substrate 3 on which the compact for solid electrolyte 9 is not formed.

Then, the laminate compact is subjected to a binder removing treatment, and then to co-sintering (co-firing) at 1400 to 1600° C. in an oxygen-containing atmosphere for 2 to 6 hours.

After that, the slurry for intermediate layer 4 is applied onto the surface of the sintered compact for first layer 4a to form a compact for second layer 4b, followed by sintering. In the invention, when sintering the compact for second layer 4b, the sintering is preferably performed at a temperature 200° C. or more lower than the temperature at which the solid electrolyte 9 and the first layer 4a are co-sintered, and for example, a temperature of 1100° C. to 1300° C. is preferred.

In the case of forming the second layer 4b with a plurality of layers, the production method can be adjusted as appropriate, such as sequentially sintering the layers that constitute the second layer 4b.

Here, to make the second layer 4b dense, sintering time can be adjusted as appropriate, for example, according to the particle size of the raw material for intermediate layer 4 and the sintering temperature. It is also possible to make the second layer 4b dense by causing the second layer 4b and the first layer 4a to be fixed to each other by sintering, and continuously firing it. In this case, the temperature and time at and during which the continuous firing is performed are preferably adjusted as appropriate such that the second layer 4b and the oxygen-side electrode 1 can be tightly bonded. The sintering time for causing the second layer 4b and the first layer 4a to be fixed to each other can be set to 2 to 6 hours.

Further, the compact for solid electrolyte 9 of the invention is a concept further including a calcined compact for solid electrolyte 9, and thus the compact for intermediate layer 4 may be laminated onto the calcined compact for solid electrolyte 9.

Furthermore, a slurry containing a material for oxygen-side electrode 1 (e.g., $LaCoO_3$-based oxide powder), a solvent and a pore-forming agent is applied onto the intermediate layer 4 by dipping or the like. Likewise, where necessary, a slurry containing a material for P-type semiconductor layer 6 (e.g., $LaCoO_3$-based oxide Powder) and a solvent is applied onto a predetermined position of the interconnector 2 by dipping or the like, followed by firing at 1000 to 1300° C. for 2 to 6 hours, and thereby, a fuel cell 10 of the invention having the structure shown in FIGS. 1A and 1B can be produced. After production, it is preferable to feed a hydrogen gas into the fuel cell 10 to perform a reduction treatment for the conductive support substrate 3 and the fuel-side electrode 7. In this case, for example, the reduction treatment is preferably performed at 750 to 1000° C. for 5 to 20 hours.

That is, in the production of the fuel cell 10 of the invention, the first layer 4a and the second layer 4b are produced in separate steps, the second layer 4b is fired, and then the oxygen-side electrode 1 is fired (sintered). Accordingly, the second layer 4b will not contain the components of the oxygen-side electrode 1. Consequently, it is possible to suppress the components contained in the oxygen-side electrode 1 from diffusing into the solid electrolyte 9 immediately after the production of the fuel cell 10.

Furthermore, a fuel cell stack of the invention is configured as follows. A plurality of fuel cells 10 produced as described above are arranged in an upright manner and fixed to a manifold. Current collector members are interposed between these fuel cells 10 such that one side of a current collector member is bonded to the oxygen-side electrode 1 of a fuel cell 10 with a conductive adhesive such as conductive ceramics and the other side of the current collector member is bonded to the P-type semiconductor layer 6 of an adjacent fuel cell 10 with a conductive adhesive. In this manner, a plurality of fuel cells 10 are electrically connected in series, and a fuel cell stack is produced.

The fuel cell stack of the invention is obtained by electrically connecting a plurality of fuel cells 10 produced as described above, and thus the fuel cell stack has superior long-term reliability.

Furthermore, a fuel cell apparatus of the invention is configured by housing the above-described fuel cell stack in a container and providing a fuel gas supply pipe for supplying a fuel gas such as town gas and an air supply pipe for supplying air as an oxygen-containing gas in the container.

The fuel cell apparatus of the invention is produced by housing the above-described fuel cell stack into a container. Therefore, a fuel cell apparatus with superior long-term reliability in which power generation performance degradation during long-time power generation is prevented can be obtained. In this case, it is also possible to house a plurality of connected fuel cell stacks into a container.

EXAMPLES

The following describes examples in which the second layer 4b is formed as a single layer.

First, a NiO powder having an average particle size of 0.5 µm and $Y_2O_3$ powder having an average particle size of 0.9 µm were mixed such that the volume ratio between NiO and $Y_2O_3$ after firing and reduction would be 48:52 vol %. A mixture prepared using the powders, an organic binder and a solvent was extruded, dried and dewaxed to produce a compact for conductive support substrate 3. For Sample No. 1, the $Y_2O_3$ powder was mixed such that the volume ratio between NiO and $Y_2O_3$ after firing and reduction would be 45:55 vol %.

Next, a slurry for fuel-side electrode 7 prepared by mixing a NiO powder having an average particle size of 0.5 µm, powder of $ZrO_2$ solid solution containing $Y_2O_3$, an organic binder and a solvent was applied onto the compact for conductive support substrate 3 by a screen printing method, followed by drying to form a coating layer for fuel-side electrode 7. Then, using a slurry obtained by mixing powder of $ZrO_2$ solid solution (raw material powder of the solid electrolyte 9) that contains 8 mol % of yttrium (Y) and has a particle size measured by Microtrac method of 0.8 µm, with an organic binder and a solvent, a 30-µm-thick sheet for solid electrolyte 9 was produced by a doctor blade method. This sheet for solid electrolyte 9 was attached onto the coating layer for fuel-side electrode 7, and then dried. In Sample No. 3, the $ZrO_2$ powder had a particle size of 1.0 µm. In Sample No. 4, the sheet for solid electrolyte 9 had a thickness of 40 µm.

Subsequently, the laminate compact in which the compacts were laminated as described above was calcined at 1000° C. for 3 hours.

Next, a composite oxide containing 85 mol % of $CeO_2$ and 15 mol % of any one of other rare earth element oxides ($SmO_{1.5}$, $YO_{1.5}$, $YbO_{1.5}$ and $GdO_{1.5}$) was pulverized with a vibration mill or ball mill using isopropyl alcohol (IPA) as a solvent, calcined at 900° C. for 4 hours, and pulverized again with a ball mill to adjust the aggregation number of ceramic particles. Thereby, raw material powder for an intermediate layer 4 was obtained. This powder is added with an acrylic binder and toluene, followed by mixing to prepare an intermediate layer 4 slurry. The slurry was applied onto the calcined compact for solid electrolyte 9 of the above-obtained calcined laminate compact by a screen printing method to produce a compact for first layer 4a. The content of the other rare earth element oxide was 10 mol % in Sample No. 5, and 20 mol % in Sample No. 6. In Sample No. 7, the calcining temperature was 850° C.

Subsequently, an interconnector 2 slurry was prepared by mixing a $LacrO_3$-based oxide, an organic binder and a solvent. This slurry was laminated onto the exposed portion of the calcined compact for conductive support substrate 3 on which the calcined compact for solid electrolyte 9 was not formed, and co-sintering (co-firing) was performed at 1510° C. in the air atmosphere for 3 hours.

Next, the above-prepared slurry for intermediate layer 4 was applied onto the surface of the sintered compact for first layer 4a by a screen printing method to form a film for second layer 4b, and a sintering process was performed for 3 hours at temperatures listed in Table 1.

For Sample Nos. 12 to 15 of Table 1, co-sintering was performed without forming the first layer 4a, and only the second layer 4b was sintered in a separate step. For Sample No. 16, the second layer 4b was not formed.

After that, a cross section was observed with a scanning electron microscope for the presence or absence of a separation between the intermediate layer 4 and the solid electrolyte 9. In addition, the thicknesses of the first layer 4a and the second layer 4b were determined, which are shown in Table 1.

In addition, the fixation of the second layer 4b with the solid electrolyte 9 or the first layer 4a was checked by rubbing with a finger or using ultrasonic cleaning machine. When the layers were separated, it was determined as having no fixation. When the layers were not separated in any of the methods, it was determined as having fixation.

Next, a mixed solution of a $La_{0.6}Sr_{0.4}Co_{0.2}Fe_{0.8}O_3$ powder having an average particle size of 2 µm and isopropyl alcohol was produced, and the mixed solution was applied onto the surface of the intermediate layer 4 of the sintered laminate compact by spraying to form a compact for oxygen-side electrode 1. The obtained compact was fired at 1100° C. for 4 hours to form an oxygen-side electrode 1. Thus, a fuel cell 10 as shown in FIGS. 1A and 1B was produced.

The produced fuel cell 10 had dimensions of 25 mm×200 mm. The conductive support substrate 3 had a thickness (the thickness between the two surfaces constituting the flat portions n) of 2 mm, and an open porosity of 35%. The fuel-side electrode 7 had a thickness of 10 µm and an open porosity of 24%. The oxygen-side electrode 1 had a thickness of 50 µm, an open porosity of 40%, and a relative density of 97%.

Next, a hydrogen gas was fed into the fuel cell 10 to perform a reduction treatment for the conductive support substrate 3 and the fuel-side electrode 7 at 850° C. for 10 hours.

The obtained fuel cell 10 was subjected to EPMA (X-ray microanalyzer) area analysis for diffusion of Zr contained in the solid electrolyte 9 into the intermediate layer 4 (the first layer 4a and the second layer 4b) and for diffusion of Sr contained in the oxygen-side electrode 1 into the solid electrolyte 9. The result is given in Table 1 under the headings "Presence or absence of Zr" and "Presence or absence of Sr".

Here, the presence or absence of Zr and Sr was determined as follows. When Zr was not found in the first layer 4a and the second layer 4b, or when Sr was not found in the solid electrolyte 9, it was determined as absent. Conversely, when Zr or Sr was found, it was determined as present.

Subsequently, a fuel gas was allowed to circulate through the fuel gas flow channels 5 of the obtained fuel cell 10, an oxygen-containing gas was allowed to circulate through the outside of the fuel cell 10, and the fuel cell 10 was heated to 750° C. using an electric furnace to perform a power generation test for 3 hours, and thereby power generation performance of the fuel cell 10 was checked. After that, the fuel cell 10 was operated for power generation for 1000 hours under conditions of a fuel utilization rate of 75% and a current density of 0.6 A/cm². At this time, the voltage was measured after 1000 hours, taking the value obtained at power generation time of 0 as an initial voltage, and a change from the initial voltage was obtained as a degradation rate to obtain power generation performance degradation rate.

The power generation performance degradation was evaluated as follows. When the degradation rate was less than 0.5%, it was graded as "very small". When the degradation rate was 0.5 to 1%, it was graded as "moderately small". When the degradation rate was 1 to 3%, it was graded as "small". When the degradation rate was 3 to 5%, it was graded as "large". When the degradation rate was 5% or more, it was graded as "severe". The evaluation results are shown in Table 1.

TABLE 1

| Sample No. | First layer Rare earth element | First layer Thickness μm | First layer Presence or absence of Zr | Second layer Rare earth element | Second layer Thickness μm | Second layer Firing temperature | Second layer Presence or absence of Zr | Fixation | Density of first and second layers | Presence or absence of Sr in solid electrolyte | Power generation performance Degradation rate (%) | Evaluation |
|---|---|---|---|---|---|---|---|---|---|---|---|---|
| 1 | $CeO_2$, $SmO_{1.5}$ | 1 | Present | $CeO_2$, $SmO_{1.5}$ | 10 | 1100 | Absent | Yes | First > Second | Absent | 0.4%/1000 h | Very small |
| 2 | $CeO_2$, $SmO_{1.5}$ | 5 | Present | $CeO_2$, $SmO_{1.5}$ | 10 | 1200 | Absent | Yes | First > Second | Absent | 0.4%/1000 h | Very small |
| 3 | $CeO_2$, $YO_{1.5}$ | 5 | Present | $CeO_2$, $YO_{1.5}$ | 10 | 1300 | Absent | Yes | First > Second | Absent | 0.3%/1000 h | Very small |
| 4 | $CeO_2$, $YbO_{1.5}$ | 5 | Present | $CeO_2$, $YbO_{1.5}$ | 5 | 1300 | Absent | Yes | First > Second | Absent | 0.4%/1000 h | Very small |
| 5 | $CeO_2$, $GdO_{1.5}$ | 10 | Present | $CeO_2$, $GdO_{1.5}$ | 15 | 1300 | Absent | Yes | First > Second | Absent | 0.3%/1000 h | Very small |
| 6 | $CeO_2$, $SmO_{1.5}$ | 5 | Present | $CeO_2$, $SmO_{1.5}$ | 20 | 1300 | Absent | Yes | First > Second | Absent | 0.3%/1000 h | Very small |
| 7 | $CeO_2$, $SmO_{1.5}$ | 5 | Present | $CeO_2$, $SmO_{1.5}$ | 30 | 1300 | Absent | Yes | First > Second | Absent | 0.7%/1000 h | Moderately small |
| 8 | $CeO_2$, $SmO_{1.5}$ | 5 | Present | $CeO_2$, $SmO_{1.5}$ | 1 | 1300 | Absent | Yes | First > Second | Absent | 0.8%/1000 h | Moderately small |
| 9 | $CeO_2$, $SmO_{1.5}$ | 15 | Present | $CeO_2$, $SmO_{1.5}$ | 10 | 1300 | Absent | Yes | First > Second | Absent | 0.7%/1000 h | Moderately small |
| *10 | $CeO_2$, $SmO_{1.5}$ | 5 | Present | $CeO_2$, $SmO_{1.5}$ | 5 | 1400 | Present | Yes | First > Second | Absent | 3.1%/1000 h | Large |
| *11 | $CeO_2$, $SmO_{1.5}$ | 5 | Present | $CeO_2$, $SmO_{1.5}$ | 5 | 1500 | Present | Yes | First > Second | Absent | 3.2%/1000 h | Large |
| *12 | — | — | — | $CeO_2$, $SmO_{1.5}$ | 10 | 1200 | Absent | No | — | Present | 6%/1000 h | Severe |
| *13 | — | — | — | $CeO_2$, $SmO_{1.5}$ | 10 | 1300 | Absent | No | — | Present | 6%/1000 h | Severe |
| *14 | — | — | — | $CeO_2$, $SmO_{1.5}$ | 10 | 1400 | Present | Yes | — | Present | 5%/1000 h | Severe |
| *15 | — | — | — | $CeO_2$, $SmO_{1.5}$ | 10 | 1500 | Present | Yes | — | Present | 5%/1000 h | Severe |
| *16 | $CeO_2$, $SmO_{1.5}$ | 5 | Present | — | — | — | — | — | — | Present | 5%/1000 h | Severe |
| 17 | $CeO_2$, $GdO_{1.5}$ | 5 | Present | $CeO_2$, $GdO_{1.5}$ | 10 | 1100 | Absent | Yes | First > Second | Absent | 0.3%/1000 h | Very small |
| 18 | $CeO_2$, $GdO_{1.5}$ | 5 | Present | $CeO_2$, $GdO_{1.5}$ | 20 | 1200 | Absent | Yes | First > Second | Absent | 0.2%/1000 h | Very small |
| 19 | $CeO_2$, $GdO_{1.5}$ | 5 | Present | $CeO_2$, $GdO_{1.5}$ | 5 | 1300 | Absent | Yes | First > Second | Absent | 0.4%/1000 h | Very small |
| 20 | $CeO_2$, $GdO_{1.5}$ | 1 | Present | $CeO_2$, $GdO_{1.5}$ | 10 | 1300 | Absent | Yes | First > Second | Absent | 0.4%/1000 h | Very small |
| 21 | $CeO_2$, $GdO_{1.5}$ | 1 | Present | $CeO_2$, $GdO_{1.5}$ | 10 | 1300 | Absent | Yes | First > Second | Absent | 0.4%/1000 h | Very small |
| 22 | $CeO_2$, $SmO_{1.5}$ | 1 | Present | $CeO_2$, $GdO_{1.5}$ | 10 | 1100 | Absent | Yes | First > Second | Absent | 0.02%/1000 h | Very small |
| 23 | $CeO_2$, $SmO_{1.5}$ | 5 | Present | $CeO_2$, $GdO_{1.5}$ | 10 | 1200 | Absent | Yes | First > Second | Absent | 0.01%/1000 h | Very small |
| 24 | $CeO_2$, $SmO_{1.5}$ | 5 | Present | $CeO_2$, $GdO_{1.5}$ | 20 | 1300 | Absent | Yes | First > Second | Absent | 0.01%/1000 h | Very small |

TABLE 1-continued

| | First layer | | | Second layer | | | | Density of first and second layers | Presence or absence of Sr in solid electrolyte | Power generation performance | |
|---|---|---|---|---|---|---|---|---|---|---|---|
| Sample No. | Rare earth element | Thickness μm | Presence or absence of Zr | Rare earth element | Thickness μm | Firing temperature | Presence or absence of Zr | Fixation | | | Degradation rate (%) | Evaluation |
| 25 | CeO$_2$, SmO$_{1.5}$ | 5 | Present | CeO$_2$, GdO$_{1.5}$ | 5 | 1300 | Absent | Yes | First > Second | Absent | 0.02%/1000 h | Very small |
| 26 | CeO$_2$, SmO$_{1.5}$ | 10 | Present | CeO$_2$, GdO$_{1.5}$ | 15 | 1300 | Absent | Yes | First > Second | Absent | 0.01%/1000 h | Very small |
| *27 | CeO$_2$, SmO$_{1.5}$ | 5 | Present | CeO$_2$, GdO$_{1.5}$ | 5 | 1400 | Present | Yes | First > Second | Absent | 2.1%/1000 h | Small |
| 28 | CeO$_2$, GdO$_{1.5}$ | 1 | Present | CeO$_2$, SmO$_{1.5}$ | 10 | 1100 | Absent | Yes | First > Second | Absent | 0.4%/1000 h | Very small |
| 29 | CeO$_2$, GdO$_{1.5}$ | 5 | Present | CeO$_2$, SmO$_{1.5}$ | 10 | 1200 | Absent | Yes | First > Second | Absent | 0.3%/1000 h | Very small |
| 30 | CeO$_2$, GdO$_{1.5}$ | 5 | Present | CeO$_2$, SmO$_{1.5}$ | 20 | 1300 | Absent | Yes | First > Second | Absent | 0.3%/1000 h | Very small |
| 31 | CeO$_2$, GdO$_{1.5}$ | 5 | Present | CeO$_2$, SmO$_{1.5}$ | 5 | 1300 | Absent | Yes | First > Second | Absent | 0.4%/1000 h | Very small |
| 32 | CeO$_2$, GdO$_{1.5}$ | 10 | Present | CeO$_2$, SmO$_{1.5}$ | 15 | 1300 | Absent | Yes | First > Second | Absent | 0.3%/1000 h | Very small |
| *33 | CeO$_2$, GdO$_{1.5}$ | 5 | Present | CeO$_2$, SmO$_{1.5}$ | 5 | 1500 | Present | Yes | First > Second | Absent | 3.2%/1000 h | Large |

Note:
Samples marked with an asterisk (*) fall outside the scope of the invention.

As can be seen from the results shown in Table 1, for the samples (Nos. 1 to 3, No. 17, Nos. 20 and 21) in which the first layer 4a and the second layer 4b were formed of the same composition, the first layer 4a and the solid electrolyte 9 were co-sintered, and the second layer 4b was sintered at a temperature 200° C. or more lower than the temperature used in the co-sintering, diffusion of Zr in the second layer 4b was not observed, and the second layer 4b exhibited superior fixation. Furthermore, the solid electrolyte 9 did not contain Sr, which was a component of the oxygen-side electrode 1, and the power generation performance degradation was very small. For the samples (Nos. 22, 23, 28 and 29) in which the first layer 4a and the second layer 4b had a composition containing Ce as the same rare earth element and another rare earth element that is different from Ce, diffusion of Zr in the second layer 4b was not observed, and the second layer 4b exhibited superior fixation. Furthermore, the solid electrolyte 9 did not contain Sr, which was a component of the oxygen-side electrode 1, and the power generation performance degradation was very small.

Further, the samples (Nos. 4 to 6, No. 18, No. 19, Nos. 24 to 26, and Nos. 30 to 32) in which the thickness of the second layer 4b was set to 5 to 20 μm exhibited similar results, that is, diffusion of Zr in the second layer 4b was not observed, the second layer 4b exhibited superior fixation, furthermore, the solid electrolyte 9 did not contain Sr, which was a component of the oxygen-side electrode 1, and the power generation performance degradation was very small.

For the samples (Nos. 7 to 9) in which the thicknesses of the first layer 4a and the second layer 4b were varied, diffusion of Zr in the second layer 4b was not observed, the second layer 4b exhibited superior fixation, the solid electrolyte 9 did not contain Sr, which was a component of the oxygen-side electrode 1, and the power generation performance degradation was moderately small.

On the other hand, even when the first layer 4a was co-sintered with the electrolyte, when the second layer 4b was sintered at 1400° C. or higher, or in other words, at a temperature that was lower than the temperature used for the co-sintering with a temperature difference within 200° C. (for Samples Nos. 10, 11, 27 and 33), diffusion of Zr in the second layer 4b was observed, and the power generation performance degradation was large (small for Sample No. 27), although the solid electrolyte 9 did not contain Sr, which was a component of the oxygen-side electrode 1, and the second layer 4b exhibited superior fixation.

Furthermore, the samples (Nos. 12 to 15) in which the first layer 4a was not formed and the second layer 4b was added to the sintered compact, and the sample (No. 16) in which the second layer 4b was not formed exhibited severe power generation performance degradation. Here, Samples Nos. 14 and 15 are rated as having fixation, but this is presumably because Zr contained in the solid electrolyte 9 and Zr that has diffused into the second layer 4b contributed to the increase in fixation.

The densities of the first layer 4a and the second layer 4b were compared. As a result, in all of the fuel cells 10 in which the first layer 4a and the second layer 4b were formed, the first layer 4a had a density higher than that of the second layer 4b.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:
1. A fuel cell comprising:
a solid electrolyte containing Zr;
an intermediate layer disposed on one surface of the solid electrolyte; and
an oxygen-side electrode disposed on one surface of the intermediate layer; and
a fuel-side electrode disposed on another surface opposed to the one surface of the solid electrolyte, wherein the intermediate layer includes a surface layer region that contains a first composition that includes a main material with Zr and is disposed on the side of the solid electrolyte, and another region that contains a second composition that includes the same main material without Zr;

wherein the intermediate layer is disposed between the oxygen-side electrode and the solid electrolyte, wherein the another region is disposed between the oxygen-side electrode and the surface layer region, and the surface layer region is disposed between the another region and the solid electrolyte.

2. A fuel cell comprising:

a solid electrolyte containing Zr;

an intermediate layer disposed on one surface of the solid electrolyte; and an oxygen-side electrode containing Sr disposed on one surface of the intermediate layer; and a fuel-side electrode disposed on another surface opposed to the one surface of the solid electrolyte, wherein the intermediate layer includes a surface layer region that contains a first composition that includes a main material with Zr and is disposed on a side of the solid electrolyte, and another region that contains a second composition that includes the same main material without Zr and the surface layer region is denser than the another region;

wherein the intermediate layer is disposed between the oxygen-side electrode and the solid electrolyte, wherein the another region is disposed between the oxygen-side electrode and the surface layer region, and the surface layer region is disposed between the another region and the solid electrolyte.

3. The fuel cell of claim 1 or 2, wherein the intermediate layer includes a first layer that forms the surface layer region and a second layer that forms the another region, and the first layer and the second layer contain a same rare earth element, which is not an element contained in the oxygen-side electrode.

4. The fuel cell of claim 3, wherein the first layer has a thickness of 1 to 10 µm, and the second layer has a thickness of 5 to 20 µm.

5. A fuel cell stack comprising a plurality of fuel cells which are the fuel cells of claim 1 or 2 and are electrically connected in series.

6. A fuel cell apparatus comprising a container and the fuel cell stack of claim 5 housed in the container.

7. The fuel cell of claim 1, wherein the same main material is composed of $CeO_2$ which contains at least one of Sm, Y, Yb and Gd.

8. The fuel cell of claim 2, wherein the same main material is composed of $CeO_2$ which contains at least one of Sm, Y, Yb and Gd.

9. A fuel cell comprising:

a solid electrolyte containing Zr;

an intermediate layer disposed on one surface of the solid electrolyte; and an oxygen-side electrode disposed on one surface of the intermediate layer; and a fuel-side electrode disposed on another surface opposed to the one surface of the solid electrolyte, wherein the intermediate layer includes a surface layer region that contains a first composition that includes a main material with Zr and is disposed on the side of the solid electrolyte, and another region that contains a second composition that includes the same main material without Zr;

wherein the intermediate layer is disposed between the oxygen-side electrode and the solid electrolyte, wherein the another region is disposed between the oxygen-side electrode and the surface layer region, and the surface layer region is disposed between the another region and the solid electrolyte, wherein the oxygen-side electrode contains a third composition that includes a main material, the main material of the oxygen-side electrode is different from the main material of the another region.

10. The fuel cell of claim 9, wherein the main material of the oxygen-side electrode comprises an $ABO_3$ perovskite-type oxide.

11. The fuel cell of claim 10, wherein the $ABO_3$ perovskite-type oxide comprises a $LaMnO_3$-based oxide in which Sr and La coexist in the A site, a $LaFeO_3$-based oxide in which Sr and La coexist in the A site, or a $LaCoO_3$-based oxide in which Sr and La coexist in the A site.

* * * * *